April 26, 1932.  A. G. E. JOYCE  1,855,835
ROTARY FILTER
Filed Feb. 7, 1929    6 Sheets-Sheet 1

H. G. E. Joyce
INVENTOR

April 26, 1932.  A. G. E. JOYCE  1,855,835
ROTARY FILTER
Filed Feb. 7, 1929  6 Sheets-Sheet 3

A. G. E. Joyce
INVENTOR

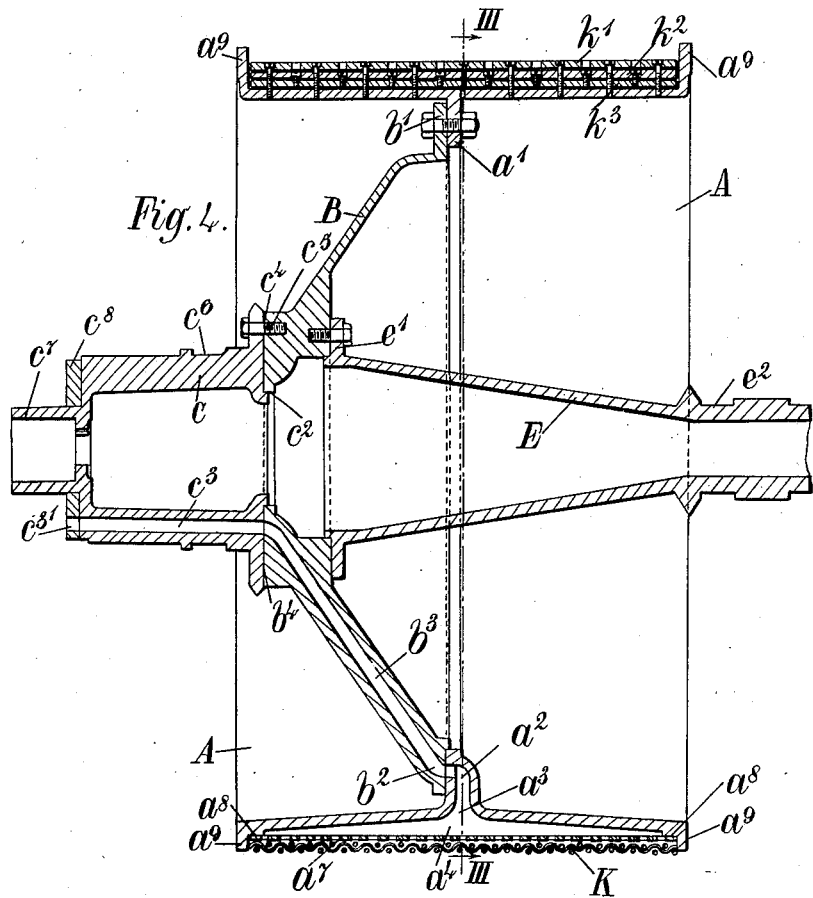
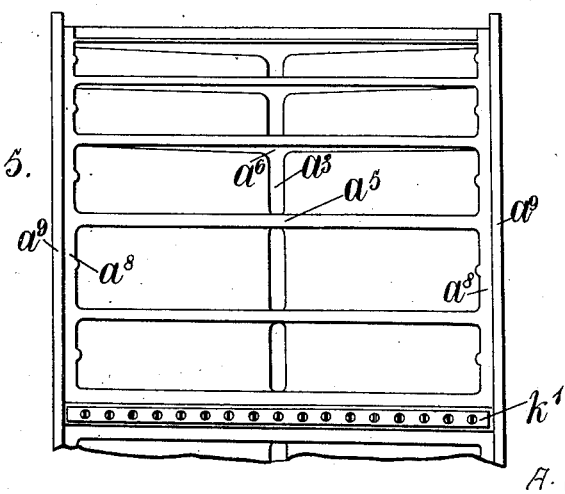

April 26, 1932.  A. G. E. JOYCE  1,855,835
ROTARY FILTER
Filed Feb. 7, 1929  6 Sheets-Sheet 5

A. G. E. Joyce
INVENTOR

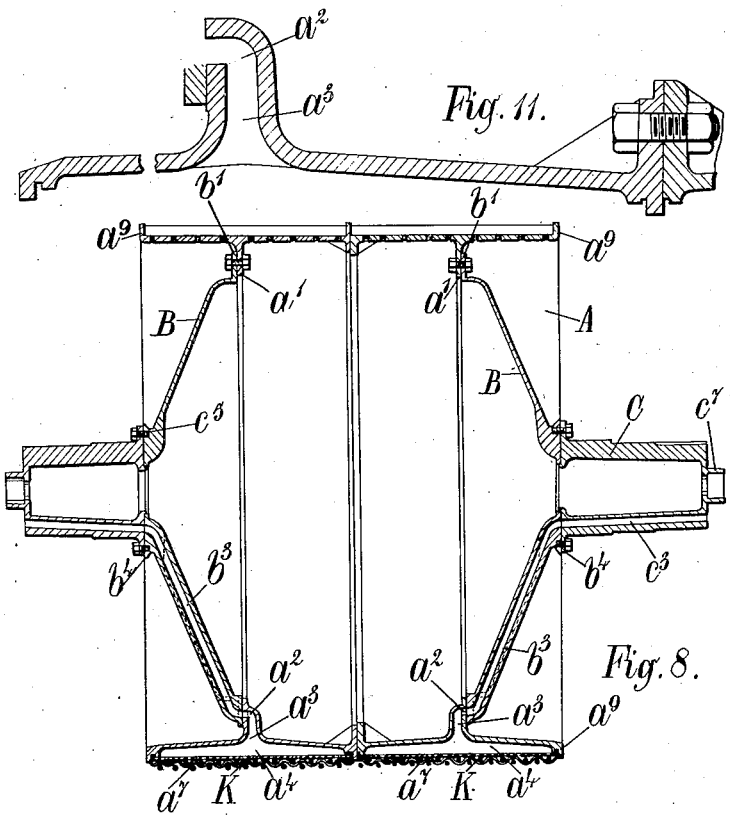
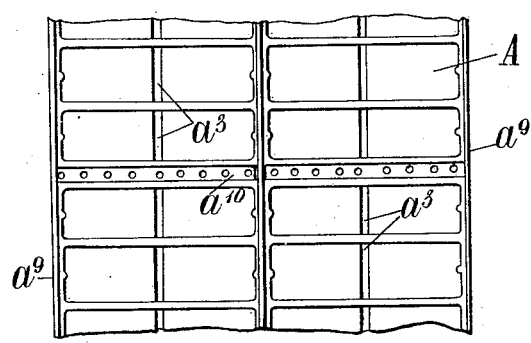

Patented Apr. 26, 1932

1,855,835

UNITED STATES PATENT OFFICE

ALFRED GEORGE EDWARD JOYCE, OF PRESTON, ENGLAND

ROTARY FILTER

Application filed February 7, 1929, Serial No. 338,265, and in Great Britain February 10, 1928.

This invention relates to rotary filters of that type in which a rotating casing dipping into the slurry or the like to be filtered has a filtering medium applied to its cylindrical periphery, the space on the inside of the said medium being divided into a number of circumferentially spaced cells, the respective cells communicating through respective passage-ways with respective ports formed in a facing on a trunnion rotating with the casing, and making joint with a ported valve head having ports so arranged that as the cells pass into the slurry a partial vacuum is formed in the cells and the filtered mother liquor drawn into a suitable receptacle, the filter cake (i. e. the solids in the slurry) being deposited on the filtering medium; after the cells pass out of the slurry the filter cake is generally washed by an external water spray, the washing liquor being drawn from the cells, by the action of the vacuum, through another port in the valve head into a separate receptacle; air is then drawn by the vacuum through the filter cake thereby partially drying it; finally the filter cake layer is removed by a knife or scraper this action being assisted by passing a reverse flow of air or other gas under pressure through a further port in the valve head into the appropriate cell; provision is also usually made for passing air or other gas under pressure, or water to each cell after it has passed the scraper and before it again enters the slurry, to cleanse the filtering medium by a reverse flow, the arrangement being such that the operation of the filter is continuous and automatic.

The passage-ways between the respective cells and the longitudinal ports in the rotating trunnion are, according to one known construction, formed by a system of parallel bore screw-jointed piping, with elbows, T's and the like screwed fittings; in such cases the inner walls of the cells are of cylindrical configuration, usually an imperforate cylindrical plate carried by the rotating casing, the ends of the pipes passing through the wall of the plate and forming the outlets from the cells, the latter being formed by transverse partition plates extending to the filtering medium. Such construction involves a large number of screwed pipe joints which have to be maintained fluid-tight, and usually necessitate comparatively sharp bends in the respective passage-ways.

In another known construction, the rotating casing comprises two inwardly dished circular end plates connected together by a number of transverse radially convergent partition walls forming the independent fluid-tight cells, the depth of the cells (measuring from their periphery towards the centre of the rotating casing) being genrally about two-thirds the radius of the rotating casing; a circumferentially disposed perforated plate (or plates) makes joint with the peripheral edges of the transverse walls and the end plates, and serves to support the filtering medium which is stretched thereon. Outlets from the cells are formed in a plane face on the rotating casing, and an extension piece is made fast to this face and carries at its remote end the relatively smaller diameter concentric ported trunnion, passage-ways which communicate between the respective cells and the respective ports in the trunnion being formed in the extension piece. The said passage-ways are in cross-section of similar shape to a circumferential section of the cells, but are of smaller area, the cross-sectional area gradually diminishing from a maximum at the said plane face to a minimum at the valve-head joint face on the end of the trunnion.

In this construction there are no sharp bends, and there are no screwed pipe joints to maintain tight. The wetted surfaces of the cells and the passage-ways are, however, comparatively great, and it is difficult to draw off, by suction, from a cell the liquid which has been filtered into it until that cell, by the rotation of the casing, has been carried nearly to a vertical plane passing through the axis of rotation, with the result that the period of revolution of the cell from this point to the point at which the knife or scraper removes the filter cake is too short to provide for a thorough washing, and for the partial air drying of the filter cake before removal by the knife or scraper The faster the rotation of the drum the worse this condition becomes.

The object of the present invention is to provide an improved construction of this type of machine.

According to the invention the shape of the cells and of a sump with which each is provided is such that, in each cell, after it has been rotated through the slurry contained in the tank, and reaches a horizontal plane passing through the axis of rotation, (or in some cases before it reaches the said plane), the liquid which has been filtered into it passes into the sump; the sump is so shaped that its transverse cross-sectional area diminishes rapidly to its outlet which is, in a radial direction in close proximity to the inner wall of the cell; the outlet has an area which preferably is no greater than is necessary to pass without undue friction the maximum flow of air or liquid; the outlet of the sump of each cell is connected by a radial or tangential passage-way of corresponding area, to its corresponding longitudinally disposed port in the trunnion. The passage-ways instead of being formed (as in the known type just described) by two dished web portions, the convex sides of which are adjacent the medial plane passing through the transverse centres of the passage-ways, and having partition walls between them, are preferably formed as tubular ducts in a single dished web portion, the concave side of which is adjacent the said medial plane so that the central portion of the said web portion is adjacent the central ported trunnion which forms the main journal for the rotating casing; this construction brings the centre of gravity of the whole rotating structure close to the said trunnion, and permits the use of a comparatively light tubular extension, bolted to the said web, to carry the journal for the bearing on the opposite side of the casing, which bearing may be of comparatively light construction.

I have illustrated my invention in the accompanying drawings, in which:—

Figs. 1 and 2 show the general arrangement;

Fig. 1 being an end elevation in outside view, and

Fig. 2 a side elevation in part section on the line II, II of Fig. 1; and

Fig. 4 is an elevation in section on the line IV, IV of Fig. 3.

Fig. 5 is a half plan view of the rotating casing corresponding with Fig. 4.

Figs. 7, 8, 9 and 10 are views similar to Figs. 3, 4, 5 and 6 and illustrate a modification in which the casing is fitted with a double row of cells;

Figure 7:
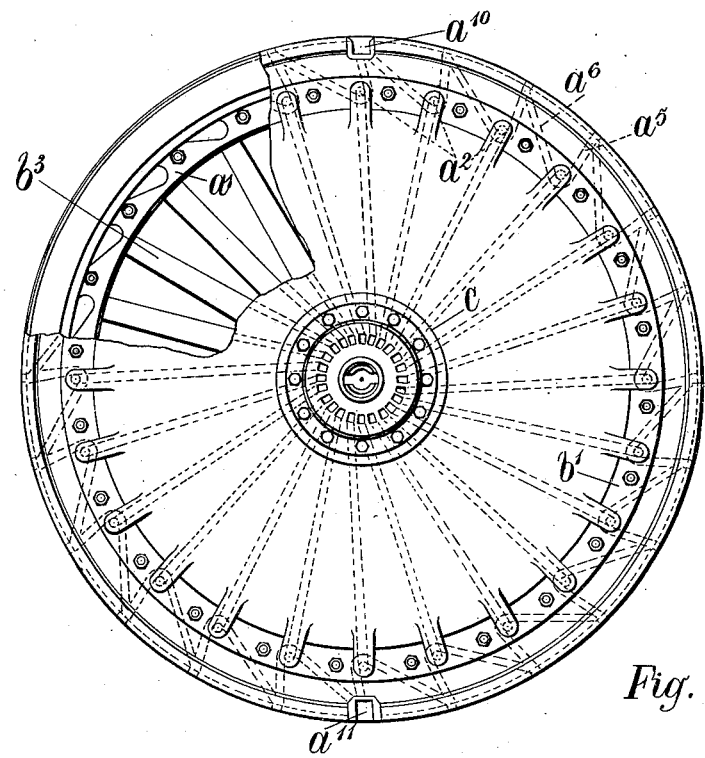

Fig. 7 being an end elevation with a portion broken away to show the parts behind.

Fig. 8 being a section on the line VIII, VIII of Fig. 7.

Fig. 9 being a part plan; and

Figure 10:
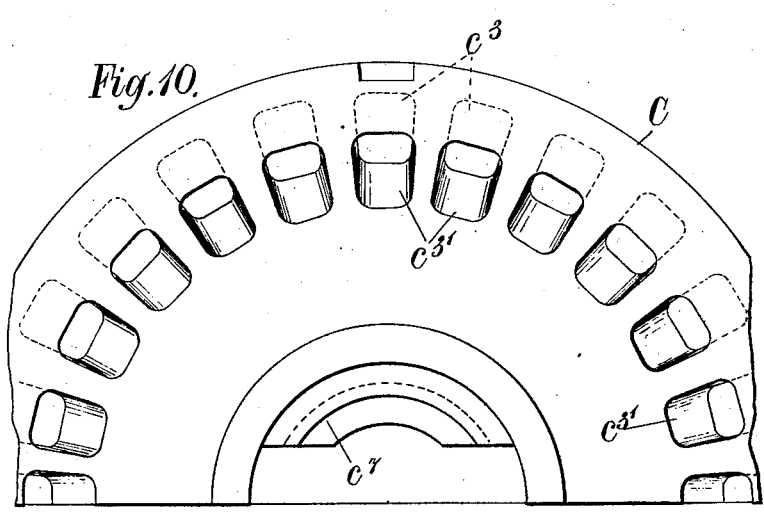

Fig. 10 a fragmentary end elevation to a larger scale.

Fig. 11 is an enlarged view of half of the lower portion of Fig. 8.

Referring first to Figs. 1 to 6; A is the rotating casing in which the cells and sumps are formed, which casing is made in a separate ring part having an internal flange $a1$, in the plane facing of which the outlets $a2$, of the sumps $a3$, of the cells $a4$, are formed, said outlets being equally spaced circumferentially. B is the dished web portion having a corresponding flange $b1$ in which the inlet $b2$ to the respective passage-ways $b3$ are formed, the joint between these two facings serving to connect the outer ring part A to the dished part B, and to make joints between the respective sump outlets and their corresponding passage-ways. The hub or trunnion C may be made integral with the web part B, or these two parts may, as shown in the drawings, be made separately and have respective ported plane facings $b4$ and $c4$ by which joints are made between the passage-ways $b3$ and the longitudinal ports $c3$ in the trunnion, concentricity being ensured by a spigot part $c2$ formed on the part C and fitting in a suitable bore in the part B. Preferably the ports in the trunnion converge towards the outer end of the trunnion, as shown. The hub is journalled in a suitable bearing D, carried by the bracket $d1$ from the foundation block $d2$.

The rotating casing is supported at the opposite end by the extension shaft E, preferably a hollow shaft having a flange $e1$ bolted to the hub of the web B; the shaft E is journalled in the bearing F carried by the bracket $f1$ from the foundation block $f2$.

The casing rotates in a semi-cylindrical tank G carried from the foundation by the brackets $g1$, and the slurry or fluid containing solids in suspension to be filtered is fed to the tank through the inlet $g2$, an overflow discharge $g3$ being fitted; an oscillating agitator H of quadrantal configuration, comprising a set of angle bars $h1$ carried from and connecting together curved angle plates $h2$ the respective ends of which are connected by pairs of radius bars $h3$ to respective straps $h4$ and $h5$ made in halves after the manner of straps for eccentric sheaves; the straps $h4$ and $h5$ respectively fit rotatably in the grooved recess $c6$ in the trunnion and the grooved recess $e2$ in the extension shaft E. Oscillatory motion is given to the agitator H by connecting it, by means of the pair of rods $h6$ to respective levers $h7$ keyed to opposite ends of a shaft $h8$, having a lever $h9$ keyed thereto and connected by the rod $h10$ to the crank $h11$ on the crank-disc $h12$ keyed to the shaft $h13$ driven by the bevel wheel $h14$ gearing with the bevel pinion $h15$ keyed on the shaft J. The shaft J is journalled in the bearings $j1$ and $j2$, and drives the casing A, through a worm $j3$ which gears with a worm wheel $e3$ keyed on the end of the extension shaft. The shaft J is driven through the wheels $j4$ on the shaft J, wheel $j5$ on shaft $j6$, bevel wheel $j7$ on shaft $j6$, bevel pinion $j8$ on shaft $j9$, which latter shaft, carried by bearings $j10$ and $j11$, is the driving shaft provided with the fast-and-loose pulleys $j12$ and $j13$.

Figure 3:
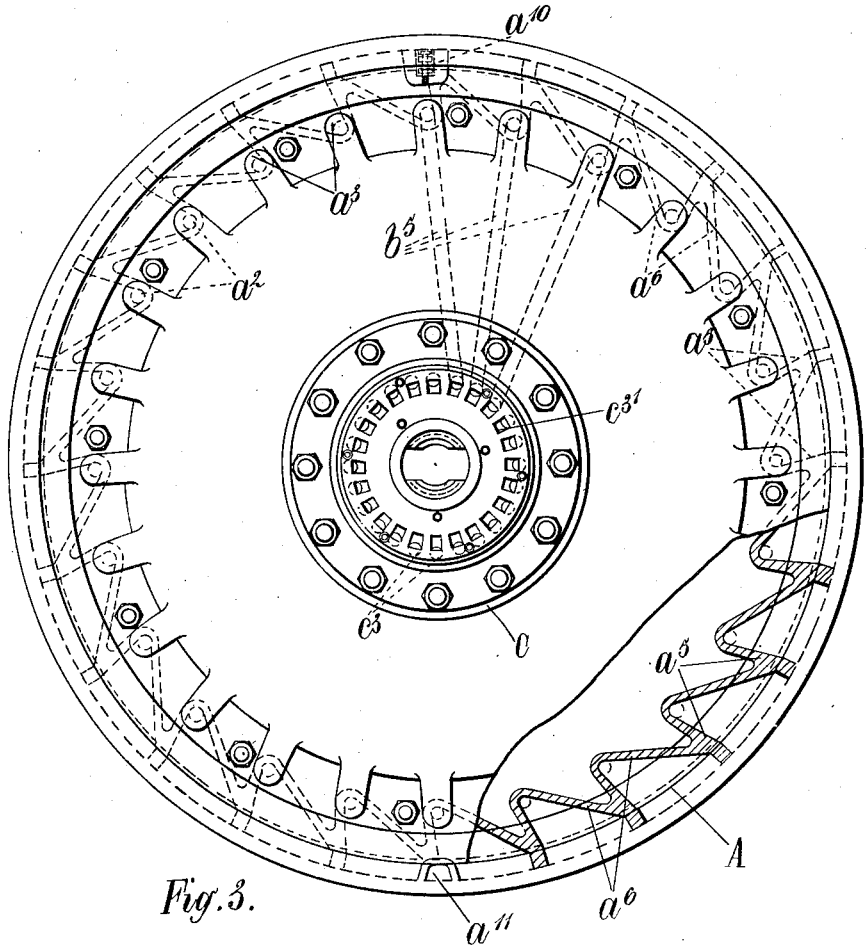
Fig. 3 is an end elevation of the rotating casing, a portion of which is shown in section on the line III, III of Fig. 4.
Figure 6:
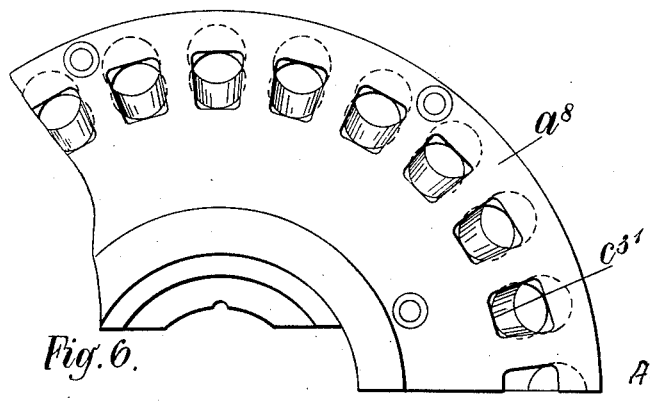
Fig. 6 is a fragmentary end view to an enlarged scale.

The approximately cylindrical portion of the outer ring which forms inner or circumferential walls of the cells $a4$ is so shaped that in each cell it slopes inwardly to the sump $a3$ and outlet $a2$ of the cell, and the planes of the walls of the sump itself slope inwardly towards the sump outlet; each cell may have symmetrically disposed walls and sump outlets; preferably, however, the sump outlet $a2$ (see Fig. 3) is located nearer to the trailing transverse partition or wall portion $a5$ than to the leading partition $a6$, and the trailing wall $a5$ of the sump is so inclined, that when the trailing wall $a5$ as it ascends cuts the horizontal plane passing through the axis of rotation, the inside face thereof slopes downwardly and inwardly to the sump outlet; the passage-way $b3$ in the web leading from this sump $a3$ may in this angular position of the casing slope downwardly and inwardly by being connected to one of the lower of the longitudinal ports $c3$ in the trunnion; in Fig. 3 it will be seen that the sump on the said horizontal plane slopes down to the longitudinal port $c3$ next below that which is on the said plane, that is to say, the centre lines $b5$ of the passage-ways may be arranged as tangents to a circle struck from the centre of rotation.

Figures 1, 1A:
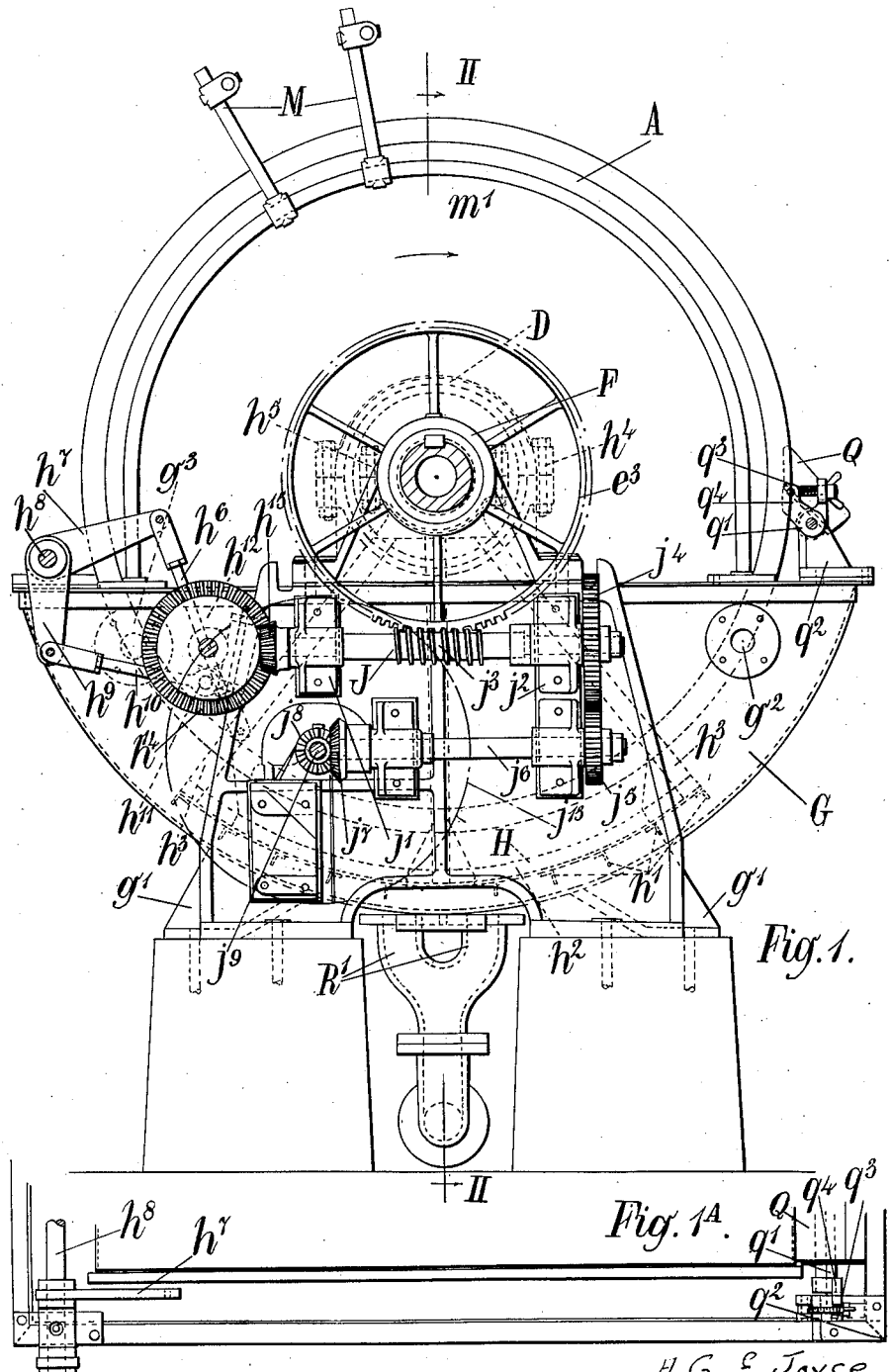
Fig. 1A is a fragmentary plan view.
Figure 2:
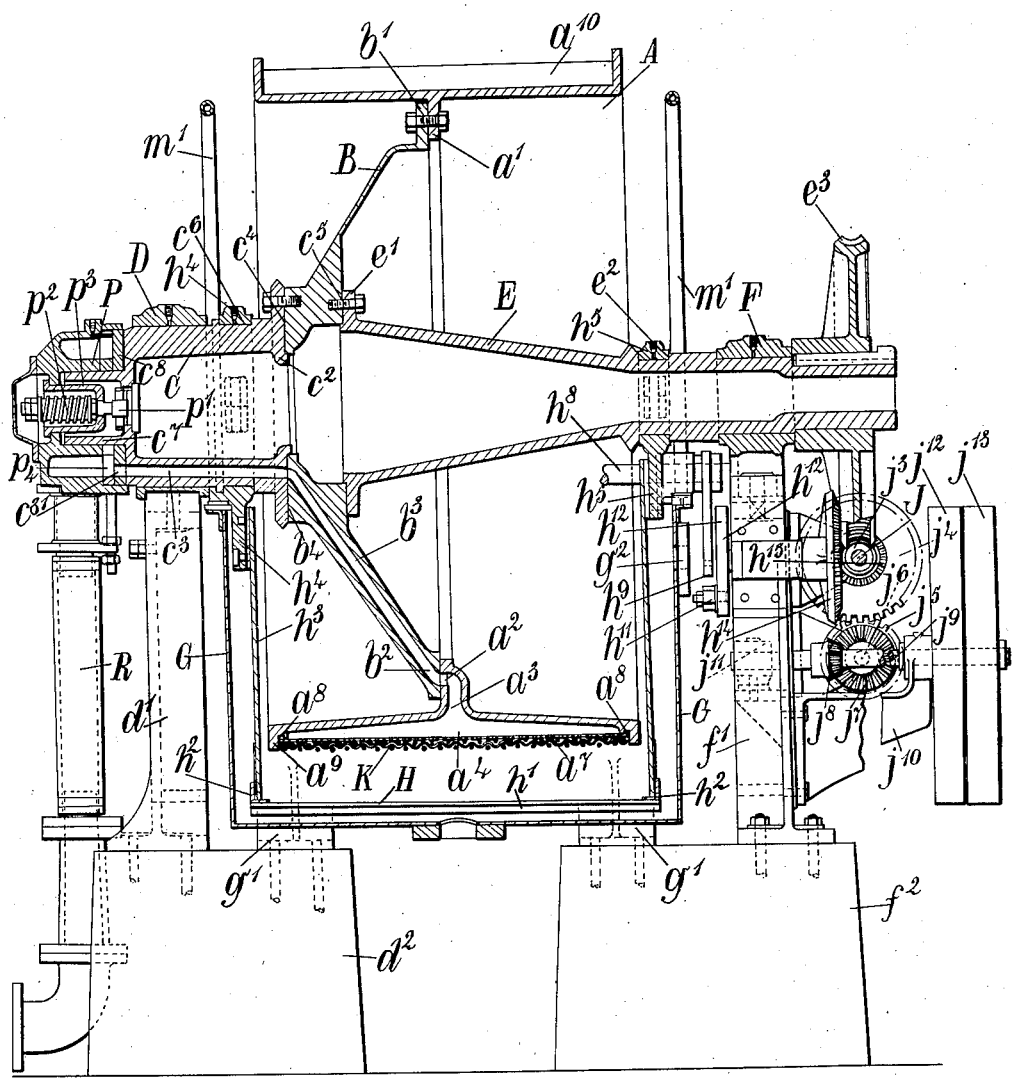

In addition to sloping tangentially as seen in the end view, the leading wall or partition $a6$ of the cells is also inclined from opposite sides to the sump as shown in the lower part of Figs. 2 and 4.

The cells are fitted with a perforated circumferential plate, or plates $a7$, of cylindrical configuration struck from the centre of rotation; these plates bear on cylindrical side seatings $a8$ and on the top of the cell partitions; a band of filter cloth K, of width equal to the distance between the flanges $c9$ of the casing A is preferably drawn taut over the surface of the perforated plates, the overlapping ends of the band being secured by being gripped between the three anchoring transverse bars $k1$, $k2$, $k3$ fitting in an anchorage recess $a10$, the centre of the band (or the other ends, where the band is in two portions) being held in place by anchoring bars $k4$ fitting in an anchorage recess $a11$. The bars are drilled and tapped, and are secured to the casing and to each other, as shown, by suitably pitched screws.

The trunnion has a spigot $c7$ and a false renewable seating $c8$ secured to the trunnion and having ports $c3'$ which align with the ports $c3$ in the trunnion; the non-rotatable valve head P is fitted on the spigot $c7$, and its ported face may be fitted with a false renewable face $p4$ which makes joint with the false seating $c8$; the valve head is held in position axially by the stud $p1$ fixed to the trunnion and a spring $p2$ on the stud bearing against a sleeve washer $p3$ the flange of which bears against an internal flange on the valve head.

The valve head has several circumferentially disposed ports with which, as the casing A rotates the respective ports $c3'$ in the false seating align in succession. The ports in the valve head are connected respectively to a mother liquor vacuum suction, a washing water vacuum suction, and a pressure air or steam supply, so that each cell $a4$ is, through its sump $a3$, passage-way $b3$ and trunnion port $c3$, put into communication, for the desired part of a revolution, with said respective vacuum and air or steam pressure.

Flexible suction pipes R are connected to the vacuum outlets on the valve head and may be connected together at their lower ends R' to a common pipe as shown, or may be separately connected to receptacles when separation of the mother and wash liquors is required.

The action is as follows:—

During the period a particular cell is in the slurry or the like in the casing G, its sump is connected to the vacuum suction which draws the mother liquor through the filter cloth into the cell. With the construction of cell described it will be seen that very soon after a cell emerges from the slurry, the filtered liquid or mother liquir in it will, by gravitation, flow into and tend to to fill the corresponding sump $a3$ and passage-way $b3$, so that the said liquor as a column will at once be drawn away into the valve head; and that this action takes place without that admixture therewith of air during its transit in the passage-way, which takes place when there is no sump and the cross-sectional area of the outlet and the passage-way is large in relation to the quantity of liquid, and both air and water are present in the passage-way. The construction according to the invention ensures that the mother liquor is drawn off from a cell as soon as the latter passes the said horizontal plane, permits the lower spray M of the two washing sprays M, M, (connected to the semi-circular water supply pipe $m1$), to be located near the said plane and permits the change being then made from the mother liquor suction ports to the washing liquor suction ports in the valve head, without liability of loss of the mother liquor in the washing liquor. By this construction a smaller area of wetted surface in the cells and passage-ways is obtained (than in the second described known type) and this is an advantage in extracting the mother and wash liquors as it results in a drier cake, the passage-ways being comparatively dry when the reverse flow of air or other gas is supplied for the lifting of the filter cake from the filtering medium. Further, in the described known types, the filtered liquor is liable to drain back through the filter cake after a cell has emerged from the slurry and in doing so to dislodge the filter cake from the drum periphery, thereby reducing the output of the machine, or in any case giving a wetter filter cake. This may be particularly the case where the solids in the slurry are granular or crystalline in form. The present invention overcomes these objections.

The angle made with a radius by the plane of the leading transverse wall or partition $a6$ of a cell sump is, of course, greater than that of the trailing wall, and in the construction last described is of opposite sense; the disposition of such wall, is, however, such as to ensure the withdrawal of the washing water before air is blown into the cell $a4$ to assist in its removal of the filter cake layer by the scraper knife Q.

The knife Q is carried by a shaft $q1$ carried in brackets $q2$ and adjustable angularly by the screws $q3$ bearing against the levers $q4$ keyed to the shaft at each end.

Where the axial dimension of the rotary filter is considerable two casings, (see Figs. 7 to 11) constructed as described (each comprising a peripheral ring part with the cells, the dished part or web with the passageways and the trunnion), may be bolted together axially in line so as to form two circumferentially disposed rows of cells communicating respectively with the oppositely disposed trunnions.

In Figs. 7 to 11 the several parts are indicated by the same reference letters employed in the modification shown in Figs. 1 to 6, and the parts described in connection with Figs. 1 to 6, not shown in Figs. 7 to 10 are constructed as described in connection with the said modification.

The passage-ways in the dished webs may be of circular or any other convenient cross-section, the web being thickened along the line of the passage-way to form the wall thereof, the thickened portions being preferably on the inside of the web, the outer surface, therefore, being a flush surface free from any projection, so that when, for example, two structures are bolted side by side as above described the exterior surfaces of the casing are plane flush surfaces. Where only one structure is employed, the side of the casing opposite to the trunnion may be closed in by a metal disc making joint at the centre with the bearing sleeve and at the periphery with the edge of the casing.

In the preferred arrangement, the mouths of the cells are, as stated, closed by perforated plates, over which the filtering medium is stretched by tensioning devices; the perforated plates may, however, in some cases be dispensed with, and the filter cloth be supported by transverse and longitudinally disposed ribs (see Fig. 9) carried from the inner wall of the cells, such ribs having transverse channels to permit the free flow of the filtered liquid across the cell.

In certain types of machine the outlets from the sumps may be connected to the respective longitudinal ports in the trunnion by respective bent, rigid pipes or flexible rubber pipes, instead of forming the passage-ways in the web of the dished portion.

The details of construction may in other respects be modified in accordance with the size and duty of the filter.

What I claim is:—

1. A rotary filter comprising a rotor divided circumferentially into shallow cells covered with filtering medium, a trunnion on which said rotor rotates in a vessel containing the material to be filtered, the level of said liquid being maintained below the centre of said trunnion, a sump of flattened funnel shape forming the middle part of each cell, a ring of ports in said trunnion and ducts connecting said ports to the outlets of said sumps, the outlet of any particular sump being at the lowest part of the sump before the rearmost wall of the sump reaches a horizontal plane through the axis of rotation whilst the centre of the outlet of each sump lies in the plane containing the axis of rotation and the trailing wall of the associated cell.

2. A rotary filter as claimed in claim 1 wherein the sump is so shaped that when the outer edge of its trailing wall rises to the horizontal plane passing through the axis of rotation, the said trailing wall slopes downwardly to the sump outlet.

3. A rotary filter as claimed in claim 1 wherein the sump is so shaped that when the outer edge of its trailing wall rises to the horizontal plane passing through the axis of rotation, the said trailing wall slopes downwardly to the sump outlet and the axis of the said duct also slopes downwardly from the sump outlet to its associated trunnion port.

4. A rotary filter as claimed in claim 1 wherein the rotor is provided with an internal centrally disposed flange, and the cross-section of the cells is so arranged that the sumps are located on one side of the said flange, the sump outlets are formed as ports in the said flange, and the rotor is connected to the trunnion by a dished or saucer-shaped web member having a peripheral flange adapted to make joint with the said internal flange of the casing; said dished member having radial ducts formed in it, one for each cell, said respective ducts communicating at the outer end with the said sump outlets, and at the inner end with the respective ports in the trunnion.

5. A rotary filter as claimed in claim 1 wherein the rotor is provided with an internal centrally disposed flange, and the cross-section of the cells is so arranged that the sumps are located on one side of the said flange, the sump outlets are formed as ports in the said flange, and the rotor is connected to the trunnion by a dished or saucer-shaped web member having a peripheral flange adapted to make joint with the said internal flange of the casing; said dished member having radial ducts formed in it, one for each cell, said respective ducts communicating at the outer end with the said sump outlets, and at the inner end with the respective ports in the trunnion, the trunnion and the dished web member being constructed as separate structures, the hub of the web member having a ported facing, the ports of which communicate with the respective ducts in the dished member, the trunnion having a corresponding face with ports leading to the valve head, said trunnion being bolted to a boss portion of the dished member so that the respective ports coincide.

6. A rotary filter as claimed in claim 1 wherein the rotor is provided with an internal centrally disposed flange, and the cross-section of the cells is so arranged that the sumps are located on one side of the said flange, the sump outlets are formed as ports in the said flange, and the rotor is connected to the trunnion by a dished or saucer-shaped web member having a peripheral flange adapted to make joint with the said internal flange of the casing; said dished member having radial ducts formed in it, one for each cell, said respective ducts communicating at the outer end with the said sump outlets, and at the inner end with the respective ports in the trunnion, the rotating casing being supported in a bearing on the side opposite to the trunnion by means of an extension shaft, connected to the boss of the dished member, and journalled in said bearing.

7. A rotary filter comprising a rotor on a horizontal trunnion, said rotor being divided into a ring of comparatively shallow circumferential cells connected by a web portion to said trunnion, the surface of each cell being arranged to slope towards a sump, the outlet from said sump being at the lowest part of said sump before the rearmost wall of the sump reaches the horizontal plane containing the axis of rotation, two of said rotors being connected together by the edges of the rings of cells to form a unitary structure having a double row of cells and a trunnion at each end.

In testimony whereof I have signed my name to this specification.

ALFRED GEORGE EDWARD JOYCE.